Aug. 25, 1970  H. OBERTHÜR  3,525,554
COUPLING FOR A LOAD-RESPONSIVE BRAKING-FORCE REGULATOR
Filed Nov. 25, 1968  2 Sheets-Sheet 1
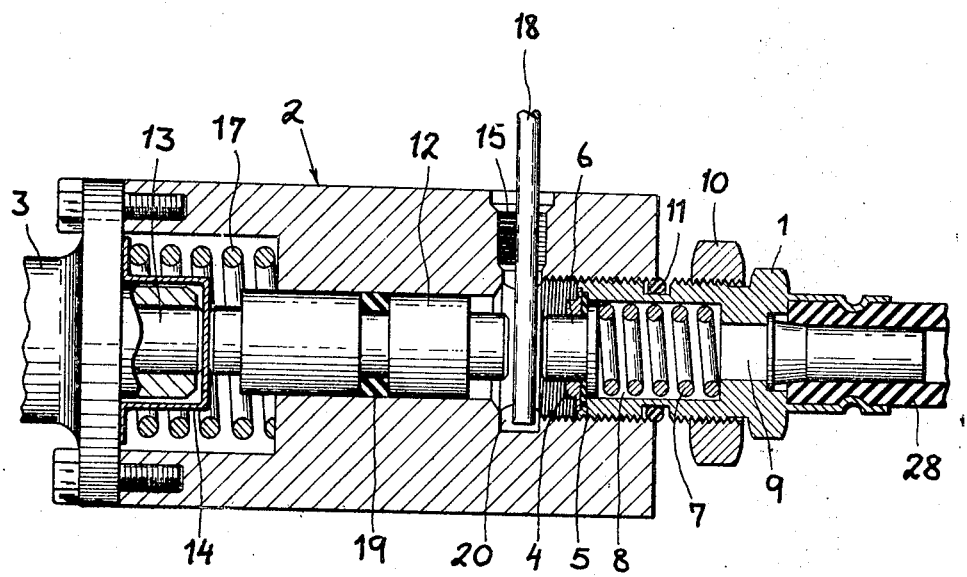
FIG. 1
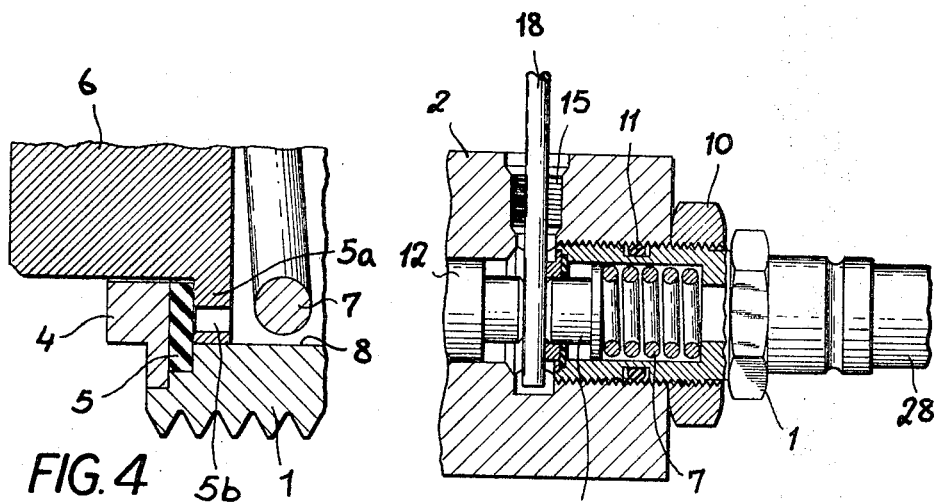
FIG. 4
FIG. 2
Heinrich Oberthür
INVENTOR.
BY
Karl J. Ross
Attorney

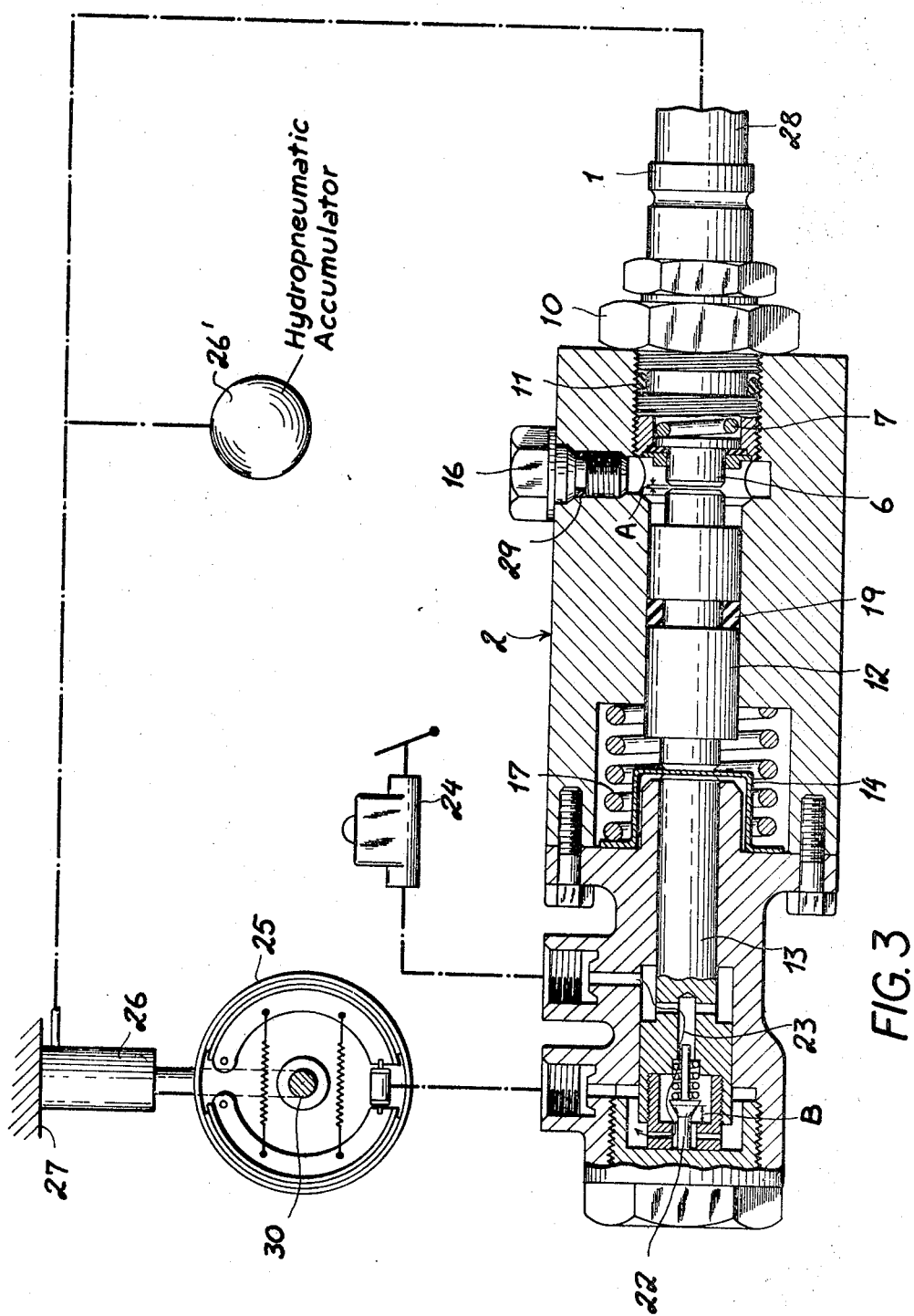

United States Patent Office 3,525,554
Patented Aug. 25, 1970

3,525,554
COUPLING FOR A LOAD-RESPONSIVE
BRAKING-FORCE REGULATOR
Heinrich Oberthür, Offenbach-Rumpenheim, Germany, assignor to Alfred Teves G.m.b.H., Frankfurt am Main, Germany, a corporation of Germany
Filed Nov. 25, 1968, Ser. No. 778,559
Claims priority, application Germany, Dec. 23, 1967,
T 35,587
Int. Cl. B60t 8/18
U.S. Cl. 303—22     11 Claims

ABSTRACT OF THE DISCLOSURE

A check valve is interposed between a braking-force regulator and the pressurized circuit which controls it. This check valve is effective to prevent the pressure in the circuit from affecting the regulator at all times except when the piston of the regulator is actuated. In this case the piston abuts and opens the check valve thereby connecting the regulator to the control circuit.

---

My invention relates to a coupling for hydraulic systems, e.g. a load-responsive braking-force regulator.

As set forth in my copending applications Ser. No. 668,517 filed Sept. 18, 1967 (now U.S. Pat. No. 3,456,-443) and Ser. No. 758,023 of Sept. 6, 1968, my prior patents, Nos. 3,167,360, 3,169,800 and 3,233,947 describe load-responsive vehicle brake regulators and devices designed to vary the braking effectiveness in accordance with the degree of actuation of the brake pedal in which a differential piston exposed to the fluid pressure of the master cylinder is effective to operate a control valve in the hydraulic line between the master cylinder and the wheel-brake cylinder to vary the aperture of the hydraulic path, a spring biasing this valve against the differential piston.

A brake regulator of this type has a braking force characteristic considered in terms of the braking effectiveness plotted against the foot pressure on the brake pedal which, at a transition or switchover point at which the valve closes so that further pressurization of the wheel-brake cylinder is effected via the force-transmitting piston, has a brake or sharp bend (kink) which is altered in dependence upon the load upon the vehicle wheels. To permit control of this transition point in accordance with the axle load of the vehicle, a feedback of mechanical or hydraulic character is provided, this feedback usually controlling the stress upon the spring which resists displacement of the differential piston. It is possible to control not only the restoring force or the counteracting force of the spring but also the point at which the valve closes in the stroke of the differential piston within its cylinder bore. In this manner, an effect can be produced which corresponds to that obtained upon the modification of the effectiveness of the valve spring.

In the system of application Ser. No. 668,517, (U.S. Pat. 3,456,443), for example, I provide in a braking-force regulator designed to reduce the forcce transmitted to the wheel-brake cylinder at a predetermined point in the depression of the brake pedal (which may be modified in terms of the load on the rear-wheel axle in the manner described in the aforementioned patents), an arrangement wherein the stepped piston is not continuously in sealing engagement with the housing but cooperates therewith to form a throttle valve gradually narrowing communication around the outer surfaces of the piston and finally terminating it entirely. I have found that this arrangement eliminates practically all frictional wear of the seal and stepped piston and infeed eliminates all sealing engagement of the large-diameter step of the piston with the wall of the housing until such friction no longer can be significant with respect to the characteristic of the regulator.

Thus the brake regulator may comprise a regulator housing having a cylinder bore in which a stepped piston is slidable against an adjustable and preset resilient force, while sub-dividing the bore into a first working chamber communicating with the master cylinder and receiving the small-diameter step of the piston to effectively urge it in the direction of the resilient bias and a second working chamber communicating with the wheel-brake cylinder and effective to apply pressure to the large-diameter step. When the pressure differential suffices to close the newly provided throttle valve between the housing and the outer periphery of the large-diameter step, the piston is gradually induced to move against the restoring force and reduce, in turn, the brake force applied to the wheel-brake cylinder in terms of the brake-pedal travel.

Moreover, a part of the large step of the longitudinally shiftable stepped piston, which is slidable in a guide sleeve in the cylinder bore, is provided with a frustoconical or beveled surface which cooperates with a sealing ring seated in the wall of the bore to form a throtle valve permitting throughflow of fluid between the chambers around the stepped piston during initial actuation of the brake pedal. As the brakes become effective and the pressure builds up in the second chamber, the piston is shifted in the direction of convergence of the bevel into the ring. Finally, the ring sealingly engages the large-diameter step, e.g. at a portion of intermediate diameter, and sealingly terminates communication between the chambers. Preferably, the stepped piston is provided with a ball-type check valve in a channel which is unblocked when the brake pedal is released to form a throttle allowing flow of hydraulic fluid through the stepped piston and return thereof to its initial position. The sealing ring, which preferably has an inwardly bulging inner periphery, may be composed of an elastomeric material such as synthetic resin, rubber or the like or of a metal, such as brass.

In application Ser. No. 758,023, I have noted that, with the increasing use of dual-network brake systems, certain new problems have come to the fore. Not the least of these problems is that, in a dual-network brake system wherein the front wheels are in one brake network and the rear wheels in another, failure of the front-wheel brake network in combination with a regulator on the rear wheels could lead to a dangerous condition. That is, with no front wheel braking possible and only limited braking due to the regulator in the rear-wheel network, the driver could find himself in a situation where he could not safely bring his vehicle to a halt.

According to a feature disclosed in this latter application, the rear-wheel braking-force regulator is provided with a cutout which is actuated on pressure loss in the front brakes to render the regulator ineffective, thereby permitting direct braking of the rear wheels. This cutout has the form of a lever which engages a rod connected to or entrained with a piston of the regulator. As long as there is pressure above a predetermined level in the front-wheel brakes, a cylinder-and-piston arrangement prevents this lever from engaging and locking the shaft which locking blocks the piston and renders the regulator ineffective.

Thus braking regulators exist which are responsive to motor-vehicle load so that, in case of an extremely heavy load, the brakes will be compensatorily applied more strongly. Generally speaking, such regulators diminish only the braking force in the rear wheels to give the vehicle the best handling and stopping characteristics possible.

The braking-force regulator for such a system basically has a piston which can be acted upon by the hydraulic or pneumatic force of the suspension system. Pressure is always present in the suspension system so that this piston or more exactly its seal is constantly under stress. This can tend to make the seal stick thus hampering the functioning of the regulator, or it can bring about a leak.

It is therefore a main object of the present invention to provide a coupling for a load-responsive braking-force regulator and other hydraulic systems which will overcome these and other disadvantages.

I do this by providing my coupling with a check valve arranged such that it only forms a hydraulic or pneumatic connection between the load-responsive pressure source and the regulator piston or plunger when this latter is in its actuated position. Thus, all the wear and tear is off the piston when the regulator is at rest; only when the regulator is actuated to a point where the load becomes relevant, is this source of pressure, which is proportional to the load, connected to the piston.

The check valve comprises a valve member which is spaced from and in line with the plunger or piston of the regulator. When the piston is moved enough to bridge this space, which should be smaller than the actuating travel of the regulator piston or plunger, it pushes the valve member back thereby allowing itself to be acted upon by the pressure of the source. A key feature of this invention is, therefore, that the plunger or piston responsive to hydropneumatic (fluid) pressure is in force-transmitting relationship via a rigid body with the check-valve member to displace the latter and establish communication between the controlled plunger and the source of control pressure.

According to another feature of my invention the coupling system is built with a radial bore through which a shim or gauge can be inserted to accurately set the gap between the check-valve member and the plunger. This plunger can comprise the regulator piston, the spring cup customarily resting thereon, and a third piston member lying on the other side of this cup. A further feature of my invention is that it is possible to dismantle the regulator without being obliged to drain the load-responsive pressure source.

These and other features, objects, and advantages of my invention will be more fully described in the following with reference to the drawing, in which:

FIG. 1 shows a coupling with a shim inserted for adjusting;

FIG. 2 shows a further step in the adjustment operation for my invention;

FIG. 3 shows a hydraulic system incorporating my coupling; and

FIG. 4 is an expanded view of a detail of FIG. 3.

As shown in FIG. 3, my coupling system is connected between a braking-force regulator 1 (see my commonly assigned applications Nos.: 652,475 filed July 11, 1967; 668,517 filed Sept. 18, 1967; and 674,479 filed Oct. 11, 1967) and a male connecting fitting 1 of a vehicle suspension.

The regulator 3 basically functions as described in the above-mentioned applications. It has a piston 13 which is fitted with a valve arrangement 22 which has a travel shown by B. Brake fluid can flow through the regulator 3 along the path indicated by an arrow 23 during light braking, and is transmitted across the piston 13 during heavy braking. The right-hand face of the piston 13 is larger than the left-hand one so that when the valve 22 is actuated on movement of the piston 13 to the right, force is transmitted differentially.

A master cylinder 24, such as described in the commonly assigned application No. 702,594 filed Feb. 2, 1968 by Gert Schrader, entitled "Master Cylinder for Hydraulic Installations" is connected through this regulator 3 to a drum brake 25, here on a rear axle 30 of an automotive vehicle (not otherwise shown).

Between this axle 30 and a portion 27 of the frame of the vehicle is a cylinder 26 which is part of the vehicle suspension. When the vehicle is heavily loaded, the fluid in this cylinder 26 and the accumulator 26' will be more greatly pressurized. This cylinder 26 is connected through a tube 28 to the connection 1.

This male fitting 1 is threaded into the complementarily threaded female coupling housing 2 and can be tightly held thereon by a lock nut 10. It is sealed against pressure loss by an O-ring 11.

A spring 17 bears against the piston 13 through a spring cup 14. A plunger member 12, with a seal 19, abuts the other face of this cup 14.

The fitting 1 houses a spring 7 in a chamber 8, which spring 7 bears against a valve member 6. A ring 4 force fitted into the end of the connection 1 holds a seal 5 which acts as seat for the valve member 6. This valve member 6 is formed with a flange-like edge 6a in which are formed bores 6b (see FIG. 4) through which air or hydraulic fluid can stream when this flange 6a is not engaged with the seal 5. The member 12 is aligned with and spaced from this member 6 by a gap A which is slightly less than the travel B of the valve 22.

Referring now especially to FIG. 3, it may be noted that one compartment of the dual master cylinder 24 is connected via the brake regulator 3 to the wheel brake 25 while the other compartment of the master cylinder 25 is generally connected to the front-wheel brakes not shown.

For normal brake operation at low loads, the vehicle driver depresses the brake pedal to express brake fluid from the master cylinder 24 through the regulator 3 and to the wheel-brake cylinders of the wheel brakes 25 directly (line 23). During this portion of brake operation, the rate of increase of the pressure in the wheel-brake cylinder is identical to the rate of pressure increase at the master cylinder inasmuch as direct communication is maintained through the control piston or plunger 13, the check valve 22 of which is held in its open position by the spring 17 and the left-hand end of the regulator housing against which the check valve 22 abuts.

As the force applied to the brake pedal increases, a corresponding increase in pressure occurs within the master cylinder 25 and within the regulator housing. As a result of the larger effective area at the left-hand side of the piston 13 than at the right-hand side thereof (FIG. 3), a force differential is developed and by differential piston action, as described in the aforementioned copending applications and U.S. patents, displaces the plunger 13 to the right against the force of spring 17. When this displacement is sufficient to take up the clearance B, valve 22 closes, and further pressure transmission occurs against the piston 13 rather than through the latter. As a result, the rate of pressure increase in the wheel-brake cylinder, as compared with the rate of pressure build-up in the master cylinder 24, is inversely proportional to the effective areas on the left and right-hand sides of the piston head respectively. The transition point or "kink" in the braking characteristic occurs at the point at which the valve member 22 engages its seat.

As also has been described in the prior applications and U.S. patents, it is advantageous, with increasing load on the vehicle suspension, to defer this transition point in terms of the braking force applied. Thus, the force of spring 17 is supplemented by the forces generated in the hydropneumatic suspension 26, 26' as applied to the intermediate plunger 12. The check valve 1, 6, however, prevents the fluctuating hydropneumatic forces in the suspensions 26, 26' from acting upon the piston on plunger 13 until the clearance A has been taken up and the plunger 13, 12 has lifted the valve member 6 from its seat. At that moment, the force acting upon the plunger 13 in opposition to the differential action of the brake fluid is equal to the force of the spring 17 and the force developed in the suspension system 26, 26'.

FIGS. 1 and 2 show successive steps in an adjustment operation for our coupling. Before completely screwing in the fitting, 1 a shim or gauge 18 of predetermined cross section is placed in a hole 15 leading from a chamber 20 between the members 12 and 13. Then the fitting 1 is screwed in until the ring 4 lightly clamps the shim 18 (FIG. 2), and the locknut 10 is tightened. After this the shim 18 is withdrawn and a plug 16 with a seal 29 is screwed into the hole 15 to seal the chamber 20 from the outside.

Three different modes of operation are possible for my coupling.

In a preferred embodiment the cylinder 26 is hydropneumatic with the line 28 connected to a gas head therein, or is entirely pneumatic. In this case the chamber 20 is full of compressed air and, in rest position, the member 12 is urged to the left by the slight residual pressure remaining in this chamber 20 after operation of the coupling.

It is also possible to use a purely hydraulic cylinder for cylinder 26. This opens up two possibilities. First, a small gas head can be maintained in the chamber 20 in which case the coupling functions much as in the pneumatic embodiment, with the gap A remaining between the members 12 and 6 in rest position. Second, the chamber 20 can be entirely filled with hydraulic fluid whereby, after adjustment and a single actuation of the member 12, the gap A would no longer be between the two members 12 and 6, but between the member 12 and the spring cup 14.

However, with all three embodiments, the performance and function are the same. That is, with all three embodiments, the load-responsive source of the pressure is only applied to the regulator 3 during actuation of this regulator 3.

I claim:
1. A hydraulic system comprising:
   a control plunger displaceable from a normal position through a first distance for regulation of a hydraulic network;
   a source of fluid pressure applicable to said plunger for controlling the displacement thereof in dependence upon said pressure; and
   a check valve between said source and said plunger and provided with a valve member in the path of and spaced from said plunger by a second distance less than said first distance in said normal position of said plunger, said member having a normally closed first position disconnecting said source from said plunger and an open second position applying said source to said plunger, said plunger being engageable with said member on a displacement from said normal position of said plunger at least equal to said second distance, said first position corresponding to a condition of nonengagement of said plunger and said member and said second position corresponding to a displacement of said plunger greater than said second distance during engagement between said plunger and said member.
2. The system defined in claim 1 wherein said hydraulic network is a motor-vehicle brake network including a braking-force regulator operated by said plunger, said source further comprising a vehicle suspension including said source, said fluid pressure being a function of vehicle load.

3. The system defined in claim 2 wherein said plunger includes a differential piston and a valve operable upon movement of said piston to permit direct flow of fluid in said network in one position of said valve and to effect force transmission across said piston between fluid acting on opposite sides thereof in another position of said valve, said one position corresponding to said first position and said other position corresponding to said second position.

4. The system defined in claim 3 wherein said plunger includes an elongated member operatively engageable and in line with said piston, said second distance being equal to a gap between said elongated member and said valve member.

5. The system defined in claim 3, further comprising a spring urging said piston into said one position.

6. The system defined in claim 4, further comprising a housing forming a substantially straight passage, said elongated member being displaceable in said passage and said check valve being mounted therein.

7. The system defined in claim 6, further comprising adjustment means in said housing for introducing a shim into said passage for setting said gap.

8. The system defined in claim 7, wherein said adjustment means comprises a port communicating with said gap, said system further comprising a removable plug sealingly covering said port.

9. The system defined in claim 6, wherein said passage forms a pressurizable chamber, said members being responsive to pressure in said chamber.

10. The system defined in claim 1, further comprising a spring urging said valve member into said closed position.

11. A hydraulic system comprising a source of hydraulic pressure, a hydraulically operable load connected with said source, a regulator valve interposed between said source and said load and having a plunger displaceable to control the pressurization of said valve, a second source of fluid pressure operatively connectable with said regulator for controlling the position of said plunger, and a check valve interposed between said second source and said plunger and biased into a closed position at least in part by the pressure of said second source, said check valve having a valve closure member cooperating with said plunger and adapted to be unblocked thereby for isolating said regulator from said second source in the absence of an unblocking movement by said plunger.

References Cited

UNITED STATES PATENTS

| 2,940,796 | 6/1960 | Ortmann et al. | 303—22 |
| 3,162,491 | 12/1964 | Van Winsen | 303—22 X |
| 3,169,800 | 2/1965 | Oberthur | 303—22 |

FOREIGN PATENTS

| 1,340,687 | 12/1962 | France. |

MILTON BUCHLER, Primary Examiner

J. J. McLAUGHLIN, JR., Assistant Examiner

U.S. Cl. X.R.

137—505.14, 627.5; 303—6